(12) United States Patent
Chen

(10) Patent No.: US 7,162,270 B2
(45) Date of Patent: Jan. 9, 2007

(54) DUAL COMMUNICATION MODE WIRELESS NETWORK TRANSMISSION DEVICE

(76) Inventor: Kuo Liang Chen, 235 P.O. Box 10-69 Chung-Ho, Taipei (TW)

( * ) Notice: Subject to any disclaimer, the term of this patent is extended or adjusted under 35 U.S.C. 154(b) by 260 days.

(21) Appl. No.: 10/696,654

(22) Filed: Oct. 30, 2003

(65) Prior Publication Data

US 2005/0096083 A1 May 5, 2005

(51) Int. Cl.
*H04B 7/00* (2006.01)
*H04B 1/38* (2006.01)
*H04B 1/00* (2006.01)

(52) U.S. Cl. ............ 455/557; 455/90.3; 455/66.1

(58) Field of Classification Search ............ 455/422.1, 455/435.2, 41.2, 41.3, 66.1, 73, 550.1, 552.1, 455/556.1, 557, 575.1, 90.3
See application file for complete search history.

(56) References Cited

U.S. PATENT DOCUMENTS

| | | | | |
|---|---|---|---|---|
| 6,765,789 B1 * | 7/2004 | Yang | ............ | 361/681 |
| 6,779,047 B1 * | 8/2004 | Caddes et al. | ............ | 710/15 |
| 6,898,766 B1 * | 5/2005 | Mowery et al. | ............ | 716/1 |
| 6,963,935 B1 * | 11/2005 | Young et al. | ............ | 710/29 |
| 2002/0091843 A1 * | 7/2002 | Vaid | ............ | 709/230 |
| 2004/0131086 A1 * | 7/2004 | Alvarado et al. | ............ | 370/487 |
| 2004/0172476 A1 * | 9/2004 | Chapweske | ............ | 709/231 |
| 2005/0152337 A1 * | 7/2005 | Wurtzel et al. | ............ | 370/352 |
| 2005/0216624 A1 * | 9/2005 | Deng et al. | ............ | 710/74 |
| 2006/0019652 A1 * | 1/2006 | Itabashi | ............ | 455/425 |
| 2006/0065743 A1 * | 3/2006 | Fruhauf | ............ | 235/492 |
| 2006/0160503 A1 * | 7/2006 | Ichitsubo et al. | ............ | 455/127.1 |

* cited by examiner

*Primary Examiner*—Sonny Trinh

(57) ABSTRACT

A wireless network transmission device is disclosed. A network control chip, a communication control chip and a control chip set are arranged in parallel. The network control chip, communication control chip, and control chip set are connected to the first module and the second module through a bus. The first module is connected to an external network communication protocol module and the second module is connected an external mobile phone communication protocol module. Thus, the system is communicable with network communication protocol module and mobile phone communication protocol module in parallel; thereby, data of different protocols being transmitted in one device. The control chip set serves to connect a PCMCIA interface to the first module and second module through the network control chip and the communication control chip.

4 Claims, 2 Drawing Sheets

DUAL COMMUNICATION MODE WIRELESS NETWORK TRANSMISSION DEVICE

FIELD OF THE INVENTION

The present invention relates to wireless communication, and particular to a wireless network transmission device which uses the network communication protocol module and mobile phone communication protocol module in parallel so that data can be transmitted effectively with a higher quality by the alternative use of the two protocol.

BACKGROUND OF THE INVENTION

With the improvement of wireless communication, the notebook computers (or even other computer devices, or PDAs (personal digital assistants, etc) can communicate wirelessly by wireless networks or through mobile phones. In general, one notebook computer is equipped only one kind of protocol so that the users only select one communication way to communicate wirelessly. However, since the wireless device is strictly confined by the coverage defined by base stations. Thereby, it is often that the communication quality is not good.

However, if the user can switch between devices using the two communication protocols so that it can select one with preferred signal quality, then a preferred communication will be acquired.

SUMMARY OF THE INVENTION

Accordingly, the primary object of the present invention is to provide a wireless network transmission device which uses two protocols for communication so as to have a preferred communication quality.

To achieve above object, the present invention provide a wireless network transmission device. A network control chip, a communication control chip and a control chip set are arranged in parallel. The network control chip, communication control chip, and control chip set are connected to the first module and the second module through a bus. The first module is connected to an external network communication protocol module and the second module is connected an external mobile phone communication protocol module. Thus, the system is communicable with network communication protocol module and mobile phone communication protocol module in parallel; thereby, two data of different protocol being transmitted in parallel. The control chip set serves to connect a PCMCIA interface to the first module and second module through the network control chip and the communication control chip.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
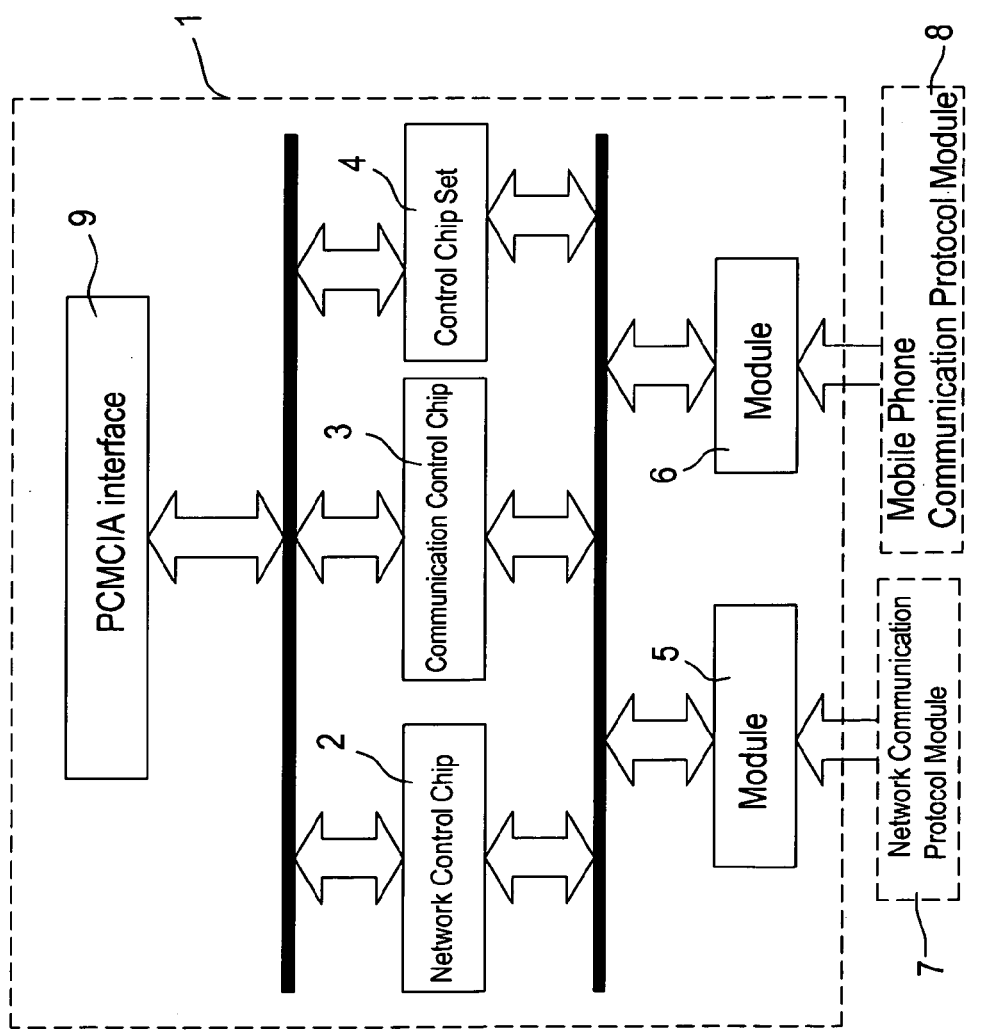
FIG. 1 shows the connection of the wireless network transmission device of the present invention.

With reference to FIG. 1, the present invention provides a system for parallel using a wireless network card and a mobile phone. The system comprises the following elements.

A wireless network transmission device 1 includes a network control chip 2, a communication control chip 3 and a control chip set 4 which are arranged in parallel. The network control chip 2, communication control chip 3, and control chip set 4 are connected to a module 5 and a module 6 through a bus. The module 5 is connected to an external network communication protocol module 7 and the module 6 is connected an external mobile phone communication protocol module 8. Thereby, the system can communicate with the network communication protocol module 7 and mobile phone communication protocol module 8 in parallel over different sections. Thereby, two data of different protocol can be transmitted in parallel.

The control chip set 4 serves to connect a PCMCIA interface 9 to the module 5 and module 6 through network control chip 2 and the communication control chip 3.

In the present invention, the protocol of the network communication protocol module 7 can selected from one of for example WLAN802.11a/b/b+/g/g+ and the protocol of the mobile phone communication protocol module 8 is selected from one of for example GPRS, CDMA, WCDMA, CDMA1X, TD-CDMA.

Figure 2:
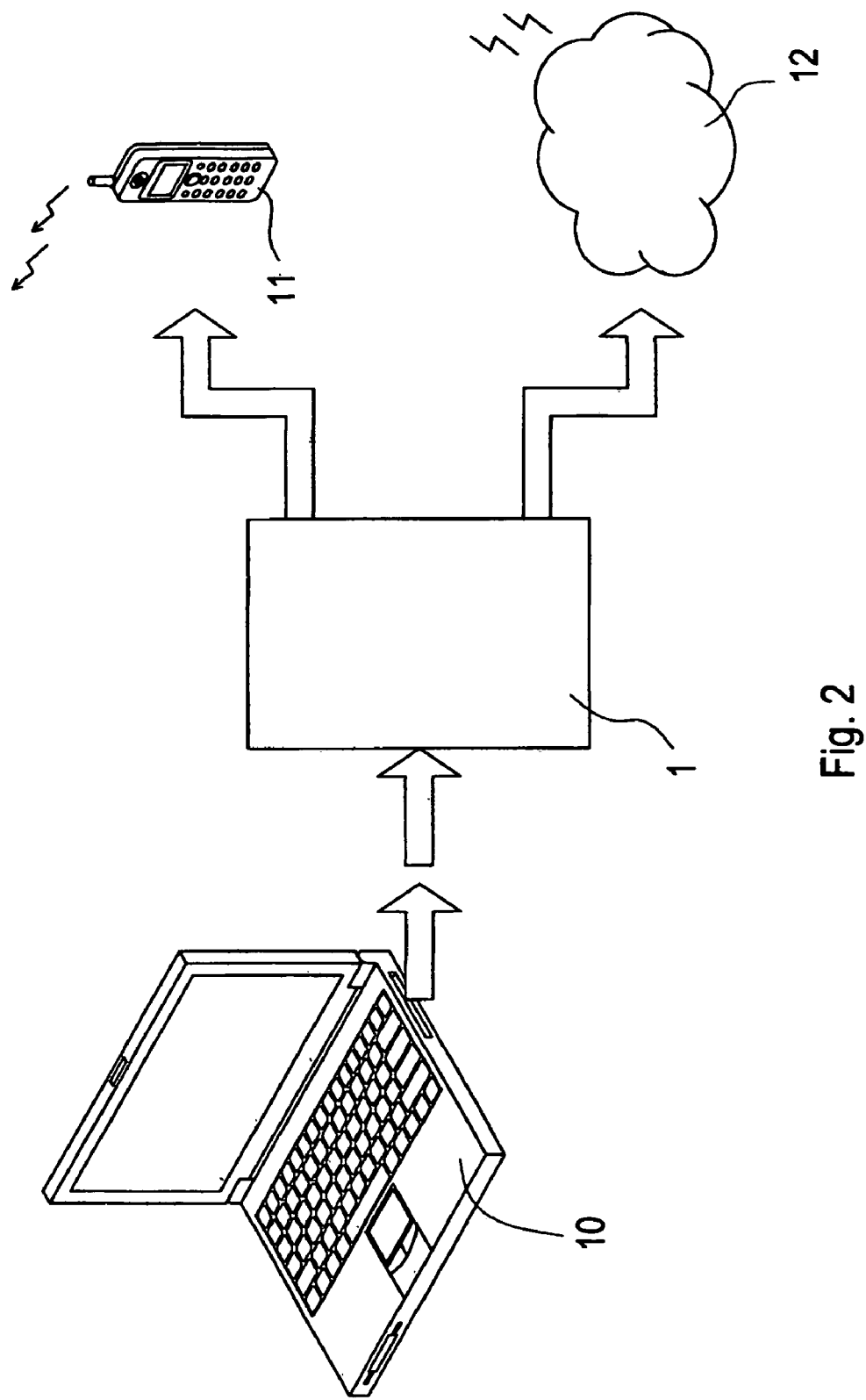
FIG. 2 is a schematic view showing one embodiment of the present invention.

With reference to FIG. 2, one embodiment of the present invention is illustrated. The wireless network transmission device 1 is installed to a notebook computer 10. Initially, the notebook computer 10 is communicated with a mobile phone 11 through the network communication protocol module 7. When the wireless network transmission device 1 is near the coverage of a base station, but not in the coverage. The data to be transmitted in the network transmission and receiving end 12 is by using the mobile phone communication protocol module 8.

Advantages of the present invention are that two protocols are used at the same time so that the communication will not confined in a narrow coverage. Thereby, when the quality of signal is not good, the module can be changed so that the decay of signals can be avoided.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A wireless network transmission device comprising
   a network control chip, a communication control chip and a control chip set which are arranged in parallel;
   a first module and a second module; wherein the network control chip, communication control chip, and control chip set are connected to the first module and the second module through a bus; wherein the first module is connected to an external network communication protocol module and the second module is connected an external mobile phone communication protocol module; thus, the system is communicable with network communication protocol module and mobile phone communication protocol module in parallel; thereby, two data of different protocol can be transmitted by using one of the two protocols;

wherein the control chip set serves to connect a PCMCIA interface to the first module and second module through the network control chip and the communication control chip.

2. The wireless network transmission device as claimed in claim 1, wherein in operation, the network control chip and communication control chip are changeable so that signal can be transmitted through one of the chip.

3. The wireless network transmission device as claimed in claim 1, wherein the network communication protocol module uses one the protocols of WLAN802.11a, WLAN802.11b, WLAN802.11b+, WLAN802.11g, and WLAN802.11g+.

4. The wireless network transmission device as claimed in claim 1, wherein the mobile phone communication protocol uses one of the protocols of GPRS, CDMA, WCDMA, CDMA1X, TD-CDMA.

* * * * *